(12) United States Patent
Igarashi et al.

(10) Patent No.: US 10,773,307 B2
(45) Date of Patent: Sep. 15, 2020

(54) COMPOSITE SINTERED BODY CUTTING TOOL

(71) Applicant: MITSUBISHI MATERIALS CORPORATION, Tokyo (JP)

(72) Inventors: Makoto Igarashi, Naka (JP); Akihiro Murakami, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 34 days.

(21) Appl. No.: 15/514,361

(22) PCT Filed: Sep. 18, 2015

(86) PCT No.: PCT/JP2015/076657
§ 371 (c)(1),
(2) Date: Mar. 24, 2017

(87) PCT Pub. No.: WO2016/047585
PCT Pub. Date: Mar. 31, 2016

(65) Prior Publication Data
US 2018/0229306 A1 Aug. 16, 2018

(30) Foreign Application Priority Data
Sep. 26, 2014 (JP) .................................. 2014-196311

(51) Int. Cl.
*B22F 3/24* (2006.01)
*C22C 29/04* (2006.01)
(Continued)

(52) U.S. Cl.
CPC ................ *B22F 3/24* (2013.01); *B22F 7/008* (2013.01); *B22F 7/062* (2013.01); *B23B 27/14* (2013.01);
(Continued)

(58) Field of Classification Search
CPC .......... B22F 3/24; B23B 27/145; E21B 10/10; E21B 10/12; E21B 10/14; E21B 10/28
See application file for complete search history.

(56) References Cited

U.S. PATENT DOCUMENTS 6,024,776 A * 2/2000 Heinrich ................. C22C 19/07
75/238
7,687,156 B2 * 3/2010 Fang ....................... B22F 7/062
407/119

(Continued)

FOREIGN PATENT DOCUMENTS

JP   2005-521790 A    7/2005
JP      5185032 B     4/2013
(Continued)

OTHER PUBLICATIONS

International Search Report dated Oct. 27, 2015 for the corresponding PCT Application No. PCT/JP2015/076657.
(Continued)

*Primary Examiner* — Cathleen R Hutchins
*Assistant Examiner* — Manuel C Portocarrero
(74) *Attorney, Agent, or Firm* — Leason Ellis LLP

(57) ABSTRACT

A composite sintered body cutting tool, in which tungsten is reduced, is made of a TiCN-based cermet and WC-based cemented carbide. The cutting tool has an angle of less than 90 degrees formed by a rake face and a flank face. The rake face including a cutting edge contains WC-based cemented carbide including 4% to 17% by mass of iron group metal components with a remainder being WC. The thickness of the carbide is 0.05 to 0.3 times the thickness of the composite sintered body. The TiCN-based cermet which is a base body of the cutting tool includes 4% to 25% of the iron group metal components, less than 15% of W, 2% to 15% of Mo, 2% to 10% of Nb, and 0.2% to 2% of Cr. The cermet may contain iron group metal Co and Ni, where, Co/Co+Ni is 0.5 to 0.8.

8 Claims, 2 Drawing Sheets

(a)

(b)

(51) Int. Cl.
  *C22C 29/08* (2006.01)
  *B22F 7/00* (2006.01)
  *C23C 30/00* (2006.01)
  *B23B 27/14* (2006.01)
  *B22F 7/06* (2006.01)
  *B22F 3/10* (2006.01)
  *B22F 5/00* (2006.01)
  *E21B 10/12* (2006.01)
  *E21B 10/14* (2006.01)
  *E21B 10/28* (2006.01)
  *E21B 10/10* (2006.01)

(52) U.S. Cl.
  CPC .............. *C22C 29/04* (2013.01); *C22C 29/08* (2013.01); *C23C 30/005* (2013.01); *B22F 3/1035* (2013.01); *B22F 2005/001* (2013.01); *B23B 27/145* (2013.01)

(56) References Cited

U.S. PATENT DOCUMENTS

2005/0115742 A1  6/2005  Daub et al.
2010/0255264 A1* 10/2010  Ishida .................. B23B 27/146
                                                      428/172

FOREIGN PATENT DOCUMENTS

| | | |
|---|---|---|
| JP | 5297381 B | 9/2013 |
| JP | 5413047 B | 2/2014 |
| JP | 2014-172157 A | 9/2014 |
| WO | WO-02/14569 A | 2/2002 |
| WO | WO-2008/147008 A | 12/2008 |

OTHER PUBLICATIONS

Extended European Search Report dated Apr. 12, 2018 for the corresponding European Patent Application No. 15844304.4.

* cited by examiner

COMPOSITE SINTERED BODY CUTTING TOOL

CROSS-REFERENCE TO RELATED PATENT APPLICATIONS

This application is a U.S. National Phase Application under 35 U.S.C. § 371 of International Patent Application No. PCT/JP2015/076657, filed Sep. 18, 2015, and claims the benefit of Japanese Patent Application No. 2014-196311, filed on Sep. 26, 2014, all of which are incorporated herein by reference in their entirety. The International Application was published in Japanese on Mar. 31, 2016 as International Publication No. WO/2016/047585 under PCT Article 21(2).

FIELD OF THE INVENTION

This invention relates to a cutting tool made of a composite sintered body of a TiCN-based cermet and WC-based cemented carbide and particularly to a cutting tool which enables the reduction of the tungsten usage, which is a rare metal, and the reduction of the deformation volume of sintered bodies during sintering and has excellent thermal crack resistance.

BACKGROUND OF THE INVENTION

For cutting tools of steel or cast iron, WC-based cemented carbide is widely used, but there has been a variety of proposals in order to reduce the tungsten usage, which is a rare metal, and obtain desired cutting performance.

For example, Japanese Patent No. 5185032 proposes a composite sintered body cutting tool made of a base material obtained by laminating a cemented carbide layer and a cermet layer which includes 15% to 65% by mass of WC and W in total and includes Co accounting for 80% by mass or more of iron group metals in bonded phases, in which, when the maximum thickness of the base material in the lamination direction is represented by h1, and the maximum thickness of the cutting edge portion in the lamination direction of the cemented carbide layer is represented by h2, h2/h1 is set to 0.002 to 0.02, thereby improving shock resistance and finished surface gloss.

In addition, for example, Japanese Patent No. 5297381 proposes a composite sintered body cutting tool made of a base material obtained by laminating a cemented carbide layer and a cermet layer which includes 15% to 65% by mass of WC and W in total and includes Co accounting for 80% by mass or more of iron group metals in bonded phases, in which protrusions and recesses having a maximum level difference of 50 μm to 500 μm are formed in the boundary between the cemented carbide layer and the cermet layer, and, when the maximum thickness of the base material in the lamination direction is represented by h1, and the maximum thickness of the cemented carbide layer disposed on the rake face side in the lamination direction is represented by h2, h2/h1 is set to more than 0.02 and 0.4 or less, thereby improving the joining properties between the cemented carbide layer and the cermet layer and preventing the deformation of the base material after sintering.

In addition, for example, Japanese Patent No. 5413047 proposes that, in the production of a tool body by forming a pressed compact of cemented carbide powder and a pressed compact of cermet powder respectively, laminating these pressed compacts together, and carrying out sintering by holding the laminate in a vacuum atmosphere at 1,300° C. to 1,500° C. for 0.5 to 3 hours, the unevenness state in the boundary between the cemented carbide layer and the cermet layer is set in a specific range or the amounts of bonded phases in both layers are adjusted to be in a specific range, thereby enhancing the joining properties between the cemented carbide and the cermet, preventing deformation caused during sintering, and improving the wear resistance and the toughness of composite sintered body cutting tools.

Technical Problem

In the composite sintered body cutting tools as described in Japanese Patent No. 5185032 and Japanese Patent No. 5297381, the tungsten usage can be reduced to a certain extent, but the cermet needs to include 15% by mass or more of W and WC, and thus the reduction of the tungsten usage is insufficient. In addition, in a case in which the above-described cutting tool is used in wet intermittent cutting, not only are the strength and the toughness insufficient, but the thermal crack resistance is also insufficient, and thus there is a problem in that abnormal damages such as chipping and fracture are easily caused.

In addition, in the composite sintered body made of the cemented carbide and the cermet which is described in Japanese Patent No. 5413047, not only is it necessary to form protrusions and recesses in the boundary between the cemented carbide layer and the cermet layer, but the shrinkage characteristics of the pressed bodies during sintering also need to be similar among different types of materials in order to obtain composite sintered bodies which deform only to a small extent during sintering. Therefore, in cutting tools produced using the above-described composite sintered bodies, the percentage of the reduction of the tungsten usage remains at approximately 30% at most, which is not sufficiently satisfactory from the viewpoint of resource saving, and, under cutting conditions that are subject to violent heat history such as wet intermittent cutting, there is a concern that the cemented carbide at the cutting edge portion may be broken due to the development of cracks or the like, and it cannot be said that the reliability is sufficient.

Therefore, an object of the present invention is to provide a cutting tool for which a composite sintered body made of a TiCN-based cermet and WC-based cemented carbide is used as the tool body, the cutting tool enabling the reduction of the tungsten usage, which is a rare metal, having an inhibitory action on a crack development even in a case in which the cutting tool is used in intermittent cutting in which intermittent and impact high loads are exerted on cutting edges, and having excellent abnormal damage resistance.

SUMMARY OF THE INVENTION

Solution to Problem

From the above-described viewpoint, the present inventors and the like carried out intensive studies regarding composite sintered body cutting tools for which a composite sintered body made of a TiCN-based cermet and WC-based cemented carbide is used as the tool body, the cutting tool enabling the reduction of the tungsten usage, having an excellent inhibitory action on crack propagation and development even in a case in which the cutting tool is used in intermittent cutting in which intermittent and impact high loads are exerted on cutting edges, and thus preventing the occurrence of abnormal damages such as chipping, fracture, and peeling throughout long-term use and found the following knowledge.

In a composite sintered body cutting tool of a TiCN-based cermet and WC-based cemented carbide, in a case in which the rake face including the cutting edge of the tool is formed of a WC-based cemented carbide layer, a compressive stress is generated due to the difference in thermal expansion rate during the sintering of the composite sintered body, and thus the intermittent cutting performance of the tool is improved, but the deformation behavior of the TiCN-based cermet during the sintering is different in the interface portion between the TiCN-based cermet and the WC-based cemented carbide layer and in the central portion of the TiCN-based cermet, and the shrinkage amount is greater in the central portion of the cermet than in the interface portion between the TiCN-based cermet and the WC-based cemented carbide layer, and thus the central portion of the cermet in the composite sintered body is significantly deformed (recessed).

However, the present inventors found that, when the component composition of the TiCN-based cermet being used is adjusted, it is possible to reduce the deformation of the central portion of the cermet, and thus the degradation of the finished surface accuracy of work materials to be cut can be prevented, additionally, the thermal crack resistance of the cutting tool can be improved, and furthermore, it is possible to reduce the tungsten usage, which is a rare metal.

As a result, it was found that, in cutting tools for which the above-described composite sintered body is used as the tool body, even in the wet intermittent cutting of alloy steel and the like in which intermittent and impact high loads and thermal loads are exerted on the cutting edge, the propagation and development of cracks is prevented, and excellent abnormal damage resistance and wear resistance are exhibited throughout long-term use.

The present invention has been made on the basis of the above-described knowledge.

"(1) A cutting tool made of a composite sintered body of a TiCN-based cermet and WC-based cemented carbide, in which (a), in the cutting tool, a planar shape of a rake face is a multangular shape, and an angle formed by the rake face and a flank face is less than 90 degrees, (b) the rake face including a cutting edge of the cutting tool is configured of WC-based cemented carbide including 4% to 17% by mass of iron group metal components with a remainder being WC as a principal hard phase component, (c) a thickness of the WC-based cemented carbide is 0.05 to 0.3 times a thickness of the composite sintered body, and (d), in the cutting tool, the TiCN-based cermet is configured of one or more TiCN-based cermet layers, in a case in which content proportions of constituent components of the cermet are represented by content proportions of metal components, the TiCN-based cermet layer adjacent to the WC-based cemented carbide includes at least 4% to 25% by mass of the iron group metal components, less than 15% by mass of W, 2% to 15% by mass of Mo, 2% to 10% by mass of Nb, and 0.2% to 2% by mass of Cr, and Co and Ni which are iron group metal components satisfy a content proportion of Co relative to a total content of Co and Ni being 0.5 to 0.8 (in terms of mass ratio).

(2) The composite sintered body cutting tool according to (1), in which a hard coating layer is deposited at least on a surface of the WC-based cemented carbide in the composite sintered body made up of the TiCN-based cermet and the WC-based cemented carbide."

Hereinafter, this invention will be described in detail.

Figure 1:
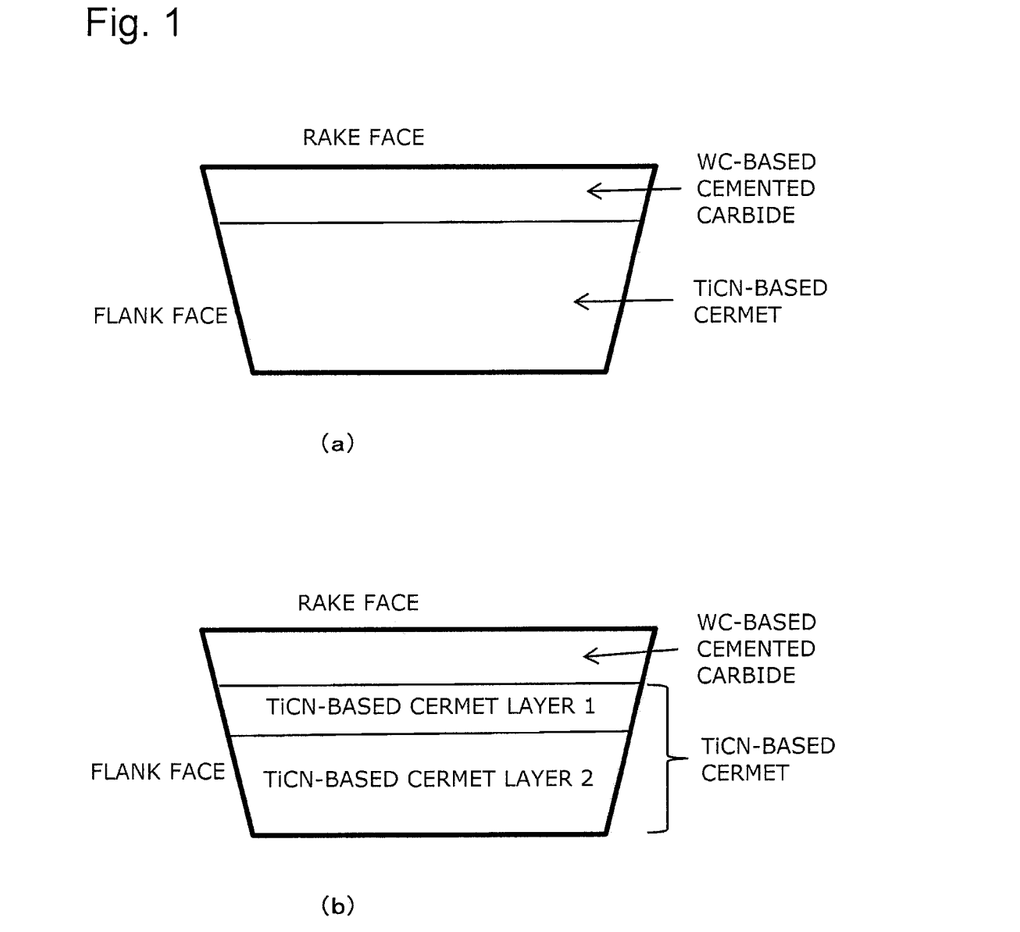

FIG. 1 illustrates schematic diagrams of a composite sintered body cutting tool of this invention, in which FIG. 1(a) illustrates an example of the composite sintered body cutting tool of this invention, and FIG. 1(b) illustrates another example thereof.

Figure 2:
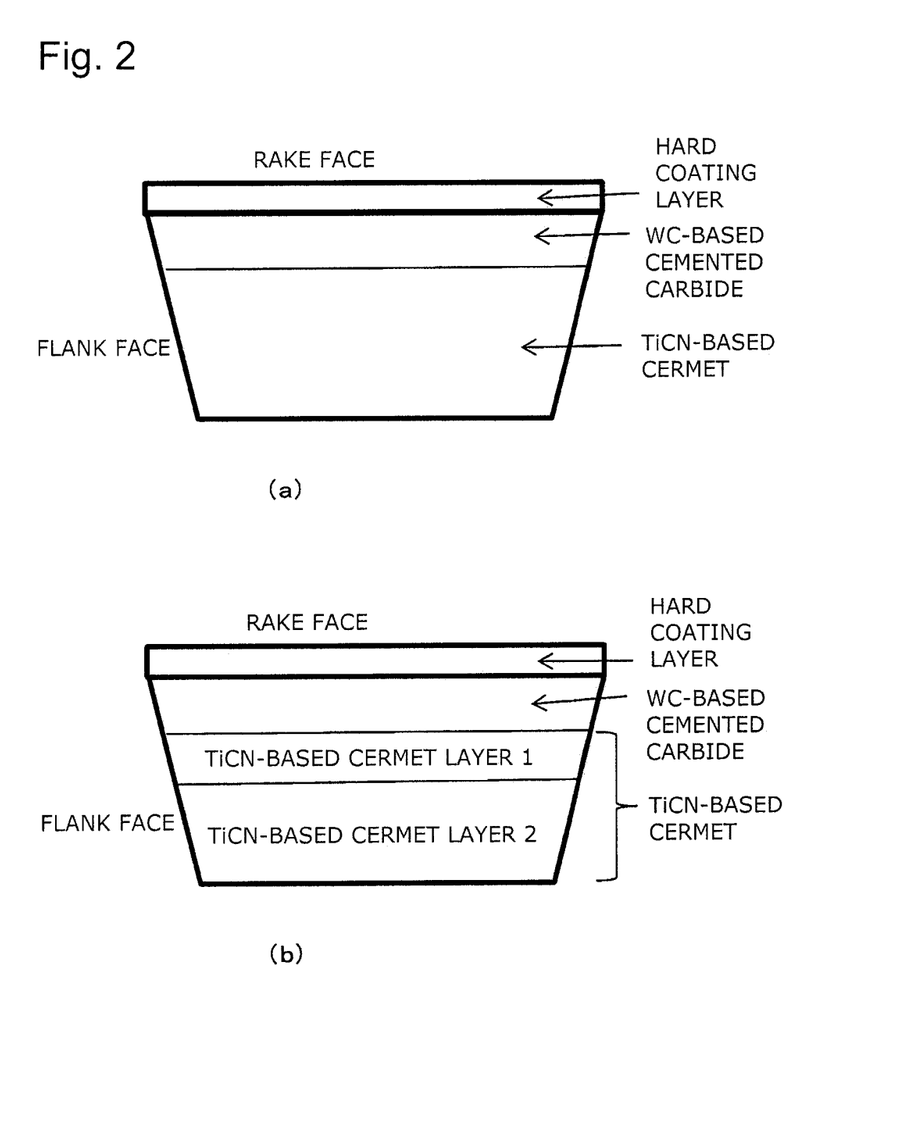

FIG. 2 illustrates schematic diagrams of a composite sintered body surface-coated cutting tool with a deposited hard coating layer on the surface of the composite sintered body cutting tool of this invention, in which FIG. 2(a) illustrates an example of the composite sintered body surface-coated cutting tool of this invention, and FIG. 2(b) illustrates another example thereof.

As illustrated in FIGS. 1(a) and 1(b), the cutting tool of this invention has a structure in which not all of the tool body is configured of the WC-based cemented carbide, the TiCN-based cermet is used as the base body, and the WC-based cemented carbide is provided on the rake face including the cutting edge.

In addition, as illustrated in FIGS. 2(a) and 2(b), this invention can also be used as a composite sintered body surface-coated cutting tool with a deposited hard coating layer on the surface of the cutting tool.

The composite sintered body cutting tool (hereinafter, also referred to as "cutting tool") and the composite sintered body surface-coated cutting tool (hereinafter, also referred to as "coated tool") of this invention can be, generally, produced using the following production method.

First, TiCN-based cermet powder having a predetermined composition and, similarly, WC-based cemented carbide powder having a predetermined composition are prepared, these powders are pressed so as to produce a composite compact in which a TiCN-based cermet and WC-based cemented carbide are laminated together, then, this composite compact is sintered, for example, in a nitrogen atmosphere of 0.1 kPa under conditions of 1,420° C.×1 hr so as to produce a composite sintered body, and then the obtained composite sintered body is processed into a predetermined shape, whereby the composite sintered body cutting tool of the present invention can be produced.

In addition, at least hard coating layers such as a Ti compound layer, a composite nitride layer of Ti and Al, and an $Al_2O_3$ layer are formed on the surface of the composite sintered body cutting tool of the present invention, which is produced above, on the WC-based cemented carbide side using a physical vapor deposition method, a chemical vapor deposition method, or the like as a monolayer or a laminated membrane of multiple layers, whereby the composite sintered body surface-coated cutting tool of the present invention can be manufactured.

Component Composition of TiCN-Based Cermet Layer Adjacent to WC-Based Cemented Carbide:

The TiCN-based cermet layer which is used in this invention and is adjacent to the WC-based cemented carbide is a cermet including TiCN as a principal hard component and iron group metals (for example, Co, Ni, and Fe) as principal bonded phase components. In a case in which the contents of other included components are converted on the basis of metal component elements, the content of W is less than 15% by mass, the content of Mo is 2% to 15% by mass, the content of Nb is 2% to 10% by mass, and the content of Cr is 0.2% to 2% by mass, and, for Co and Ni out of the iron group metal components, the ratio of the content of Co to the total content of Co and Ni is set to 0.5 to 0.8.

W:

As the content of W in the TiCN-based cermet increases, the characteristics of the TiCN-based cermet approximate to those of the WC-based cemented carbide, and thus it becomes easy to sinter the TiCN-based cermet and the WC-based cemented carbide as a composite body, but W is a component element of which the content needs to be reduced as the present invention intends. Therefore, in this invention, the content of W is determined to be less than 15% by mass.

Mo:

Mo is a component element that enhances the wettability between the hard phase and the bonded phase in the TiCN-based cermet and improves sinterability; however, when the content thereof is less than 2% by mass, the wettability improvement effect is not sufficient, and, on the other hand, when the content thereof exceeds 15% by mass, Mo is dissolved into the hard phase and degrades strength and toughness, and thus the content of Mo is determined to be 2% to 15% by mass.

Nb:

Nb has an effect of improving the high-temperature oxidation resistance of the TiCN-based cermet; however, in a case in which the content thereof is less than 2% by mass or exceeds 10% by mass, the high-temperature oxidation resistance improvement effect degrades, and thus the content of Nb is determined to be 2% to 10% by mass.

Cr:

Cr has an effect of approximating the sintering temperature of the TiCN-based cermet to that of the WC-based cemented carbide; however, when the content thereof is less than 0.2% by mass, the effect is not sufficient, and, when the content thereof exceeds 2% by mass, the free phase of $Cr_3C_2$ is precipitated, which degrades the toughness of sintered bodies, and thus the content of Cr is determined to be 0.2% to 2% by mass.

Co:

Co is an iron group metal component and is a bonded phase component in the TiCN-based cermet, and, in the correlation with Ni which is, similarly, an iron group metal component, the content proportion of Co relative to the total content of Co and Ni (Co/(Co+Ni)) needs to be set in a range of 0.5 to 0.8 (in terms of mass ratio). When the content proportion of Co relative to the total content of Co and Ni (Co/(Co+Ni)) is less than 0.5, during the sintering of the composite compact of the TiCN-based cermet and the WC-based cemented carbide, the Ni component in the TiCN-based cermet diffuses into the WC-based cemented carbide and degrades the high-temperature hardness of the WC-based cemented carbide, and, on the other hand, when the content proportion of Co relative to the total content of Co and Ni (Co/(Co+Ni)) exceeds 0.8, the toughness of the TiCN-based cermet degrades, and there is a concern that the breakage of the composite sintered body may be caused.

Therefore, regarding Co and Ni which are components included in the TiCN-based cermet, the content proportion of Co relative to the total content of Co and Ni (Co/(Co+Ni)) is set in a range of 0.5 to 0.8 (in terms of mass ratio).

The component composition of the TiCN-based cermet layer adjacent to the WC-based cemented carbide has been described above, but not the entire TiCN-based cermet needs to be configured of the component composition described above.

That is, as illustrated in FIGS. 1(b) and 2(b), it is also possible to constitute the TiCN-based cermet as a laminate of a plurality of TiCN-based cermet layers.

FIGS. 1(b) and 2(b) illustrate an example in which the TiCN-based cermet is configured as a bilayer laminate of "TiCN-based cermet layer 1" and "TiCN-based cermet layer 2", but the TiCN-based cermet can be configured as a laminate of two or more TiCN-based cermet layers.

Here, attention needs to be paid that the component composition of the TiCN-based cermet layer in contact with the WC-based cemented carbide (that is, "TiCN-based cermet layer 1" illustrated in FIGS. 1(b) and 2(b)) needs to be determined as described above, but the TiCN-based cermet layer not in direct contact with the WC-based cemented carbide (that is, "TiCN-based cermet layer 2" illustrated in FIGS. 1(b) and 2(b)) may have a component composition of an ordinarily-used TiCN-based cermet.

Components that are generally included in TiCN-based cermet, for example, ZrC and TaC can be included in the TiCN-based cermet of the present invention as long as the contents thereof are within the ordinary ranges. In addition, the content of W can be set to 8% by mass or less and preferably set to 4% by mass or less. In such a case, it is possible to further reduce the content of W included in the TiCN-based cermet without deteriorating the cutting performance of the composite sintered body cutting tool and the composite sintered body surface-coated cutting tool, and thus the effect of reducing the W usage becomes strong.

Component Composition of WC-Based Cemented Carbide:

The WC-based cemented carbide that constitutes the composite sintered body together with the TiCN-based cermet is made of WC which is a principal hard phase component and iron group metals (for example, Co, Ni, and Fe) which are principal bonded phase components. The bonded phase components are strongly bonded to the hard phase component and have an action of improving the strength and toughness of the tool body; however, when the content thereof is less than 4% by mass, a desired effect cannot be obtained with respect to the above-described action, and, on the other hand, when the content thereof exceeds 17% by mass, the wear resistance degrades, and thus the total content of the iron group metals (for example, Co, Ni, and Fe) which are the bonded phase components is set to 4% to 17% by mass.

In addition, the respective components of Ti, Zr, Nb, Ta, and Cr have an action of forming carbides, nitrides, carbonitrides, and the like and thus increasing the hardness of the WC-based cemented carbide and improving the wear resistance; however, when the total content of these hard phase components exceeds 10% by mass (in terms of metal components), the toughness degrades, and thus the total content of the respective components of Ti, Zr, Nb, Ta, and Cr is preferably set to 10% by mass or less.

WC-Based Cemented Carbide Constituting Rake Face Including Cutting Edge:

In the composite sintered body made of the TiCN-based cermet and the WC-based cemented carbide, the TiCN-based cermet serves as the tool body, and the WC-based cemented carbide is formed thereon as a rake face including a cutting edge, thereby constituting the cutting tool.

In addition, the present invention belongs to a cutting tool which is named so-called positive insert since the angle formed by the rake face and the flank face of the tool is less than 90 degrees.

In the cutting tool of the present invention, the WC-based cemented carbide as the rake face including a cutting edge has a thickness that is set to 0.05 to 0.3 times the thickness of the composite sintered body.

This is because, when the thickness of the WC-based cemented carbide is less than 0.05 times the thickness of the composite sintered body, a large load is applied to the TiCN-based cermet having poor toughness during cutting, and thus chipping easily occurs, and, on the other hand, in a case in which the thickness of the WC-based cemented carbide exceeds 0.3 times the thickness of the composite sintered body, the residual compressive stress being formed in the WC-based cemented carbide becomes small, and not only do chipping resistance and fracture resistance degrade, but the object of the present invention, that is, the reduction of the W usage cannot be achieved.

Therefore, in the present invention, the thickness of the WC-based cemented carbide is set to a thickness that is 0.05 to 0.3 times the thickness of the composite sintered body.

Hard Coating Layer:

The cutting tool of the present invention can be used as a cutting tool without any modifications by using the WC-based cemented carbide in the composite sintered body as a rake face including the cutting edge; however, when, for example, a coating of a composite nitride layer of Ti and Al is formed on at least the surface of the WC-based cemented carbide constituting the rake face including the cutting edge by means of a physical vapor deposition method, a chemical vapor deposition method, or the like, the cutting performance can be further improved.

Meanwhile, as the hard coating layer, it is possible to form coatings of not only the composite nitride layer of Ti and Al but also a variety of hard coating layers that have been already known such as nitride layers, carbide layers, and carbonitride layers of Ti, composite nitride layers of Al and Cr, and $Al_2O_3$ layers as a monolayer or a laminate of multiple layers.

Advantageous Effects of Invention

The composite sintered body cutting tool of the present invention is a positive insert made of a composite sintered body of a TiCN-based cermet and WC-based cemented carbide, in which, when the component composition ranges of the TiCN-based cermet and the WC-based cemented carbide are optimized, and the thickness ratio of the WC-based cemented carbide constituting the rake face including the cutting edge is optimized, in spite of the reduction of the tungsten usage, the thermal crack resistance does not degrade, and, in the wet intermittent cutting of alloy steel and the like in which an intermittent and impact high load and a thermal load are exerted on the cutting edge, the propagation and development of cracks are prevented, and an effect of exhibiting excellent abnormal damage resistance and wear resistance is exhibited throughout long-term use.

BRIEF DESCRIPTION OF THE DRAWINGS

These and other features and advantages of the present invention will become more readily appreciated when considered in connection with the following detailed description and appended drawings, wherein like designations denote like elements in the various views, and wherein:

FIG. 1 illustrates schematic diagrams of a composite sintered body cutting tool of this invention, in which FIG. 1(a) illustrates an example of the composite sintered body cutting tool of this invention, and FIG. 1(b) illustrates another example thereof.

FIG. 2 illustrates schematic diagrams of a composite sintered body surface-coated cutting tool of this invention, in which FIG. 2(a) illustrates an example of the composite sintered body surface-coated cutting tool of this invention, and FIG. 2(b) illustrates another example thereof.

DETAILED DESCRIPTION OF THE INVENTION

Hereinafter, this invention will be specifically described on the basis of examples.

Examples (a) First, WC-based cemented carbide raw material powder having an average grain size of 0.5 to 3 μm in a formulation shown in Table 1 was prepared.

In addition, TiCN-based cermet raw material powder having an average grain size of 0.5 to 3 μm in a formulation shown in Table 2 was prepared.

The WC-based cemented carbide raw material powder and the TiCN-based cermet raw material powder were laminated and pressed in an ISO insert-shaped mold for CCGT120408 materials in a combination shown in Table 3, thereby producing composite compacts 1 to 12.

Meanwhile, the produced composite compacts 1 to 12 were composite compacts 1 to 6 which were made of the WC-based cemented carbide raw material powder and one kind of TiCN-based cermet raw material powder and composite compacts 7 to 12 for which the WC-based cemented carbide raw material powder and two kinds of TiCN-based cermet raw material powder of raw material powder for a TiCN-based cermet layer 1 and raw material powder for a TiCN-based cermet layer 2 were used.

Next, these composite compacts 1 to 6 were sintered, thereby producing composite sintered bodies 1 to 6.

Similarly, the composite compacts 7 to 12 were sintered, thereby producing composite sintered bodies 7 to 12.

The sintering conditions are as described below in both cases.

When the composite compact was heated to the sintering temperature, the composite compact was heated from room temperature to 1,280° C. at a rising rate of 5° C./min, was heated in a range from 1,280° C. to 1,380° C. in which a liquid phase appears at a high rising rate of 30° C./min or more in both cases, and was heated from 1,380° C. to predetermined 1,420° C. at a rising rate of 5° C./min, and the composite compact was held at the sintering temperature of 1,420° C. for one hour in a nitrogen atmosphere of 0.1 kPa and is then cooled.

Next, for the obtained composite sintered bodies 1 to 6 and 7 to 12, the WC-based cemented carbide was used as the rake face, and the cutting edge portion was honed to R=0.04, thereby producing composite sintered body cutting tools 1 to 6 and 7 to 12 having a CCGT120408 shape (hereinafter, referred to as invention tools 1 to 6 and 7 to 12).

On cross-sections of the WC-based cemented carbide and TiCN-based cermet parallel to the lamination direction in the invention tools 1 to 6 and 7 to 12, the composition was analyzed using an electron beam micro-analyzer at a location 100 μm away from the interface between the WC-based cemented carbide and the TiCN-based cermet toward the WC-based cemented carbide side and at a location 100 μm away from the interface toward the TiCN-based cermet side respectively, and the average value from measurement at ten points was obtained, thereby obtaining the component compositions of the WC-based cemented carbide and the TiCN-based cermet.

These values are shown in Tables 5 and 6.

In addition, the thicknesses of the WC-based cemented carbide and the TiCN-based cermet in the invention tools 1 to 6 and 7 to 12 were observed using an optical microscope and were measured. The thicknesses were measured at five different points and were averaged, thereby obtaining the thicknesses.

These values are shown in Tables 5 and 6.

Next, for the invention tools 4 to 6 and 10 to 12, a hard coating layer made of a composite nitride of Ti and Al (here, the contents of Ti and Al were 50% by atom respectively)

was deposited on the surface of the WC-based cemented carbide by means of arc ion plating.

The layer thicknesses of the deposited hard coating layers are shown in Tables 5 and 6.

For comparison, WC-based cemented carbide raw material powder having a formulation shown in Table 1 and TiCN-based cermet raw material powder having a formulation shown in Table 2 were laminated and pressed in a combination shown in Table 4 so as to produce comparative example composite compacts 1 to 6, and then these composite compacts were sintered under the same conditions as in the examples, thereby producing comparative example composite sintered bodies 1 to 6.

In addition, comparative example sintered bodies 7 to 9 made only of WC-based cemented carbide (for convenience, referred to as comparative example composite sintered bodies 7 to 9) were produced using WC-based cemented carbide raw material powder having a formulation shown in Table 1 alone without using TiCN-based cermet raw material powder.

Next, for the obtained comparative example composite sintered bodies 1 to 6 and 7 to 9, the WC-based cemented carbide was used as the rake face, and the cutting edge portion was honed to R=0.04, thereby producing composite sintered body cutting tools 1 to 6 and 7 to 9 having a CCGT120408 shape (hereinafter, referred to as comparative example tools 1 to 6 and 7 to 9).

Next, in the same manner as in the cases of the invention tools 1 to 12, for the comparative example tools to 6, the composition was analyzed using an electron beam microanalyzer at a location 100 μm away from the interface between the WC-based cemented carbide and the TiCN-based cermet toward the WC-based cemented carbide side and at a location 100 μm away from the interface toward the TiCN-based cermet side respectively, and the average value from measurement at ten points was obtained, thereby obtaining the component compositions of the WC-based cemented carbide and the TiCN-based cermet.

Furthermore, the thicknesses of the WC-based cemented carbide and the TiCN-based cermet in the comparative example tools 1 to 6 were observed using an optical microscope and were measured. The thicknesses were measured at five different points and were averaged, thereby obtaining the thicknesses.

These values are shown in Table 7.

Next, for the comparative example tools 4 to 6, a hard coating layer made of a composite nitride of Ti and Al (here, the contents of Ti and Al were 50% by atom respectively) was deposited on the surface of the WC-based cemented carbide by means of arc ion plating.

The layer thicknesses of the deposited hard coating layers are shown in Table 7.

TABLE 1

| | | Formulation (% by mass) | | | | | |
|---|---|---|---|---|---|---|---|
| Type | | Iron group metal Co | VC | TaC | NbC | $Cr_3C_2$ | WC |
| WC-based cemented carbide raw material powder | A | 4 | — | 2 | 1 | — | remainder |
| | B | 10 | — | — | — | — | remainder |
| | C | 17 | 1 | — | — | 0.5 | remainder |
| | D | 2 | — | 2 | 1 | — | remainder |
| | E | 20 | 1 | — | — | 0.5 | remainder |
| | F | 20 | — | — | — | — | remainder |

TABLE 2

| | | Formulation (% by mass) | | | | | | | | | |
|---|---|---|---|---|---|---|---|---|---|---|---|
| Type | | Iron group metal | | | WC | ZrC | NbC | TaC | $Mo_2C$ | $Cr_3C_2$ | TiCN |
| | | Co | Ni | Fe | | | | | | | |
| TiCN-based cermet raw material powder | A | 14 | 5 | — | 12 | — | 5 | — | 10 | 1 | remainder |
| | B | 2 | 2 | — | 15 | — | 11 | — | 15 | 2 | remainder |
| | C | 16 | 4 | — | 5.5 | — | 3 | 4 | 3 | 0.3 | remainder |
| | D | 10 | 5 | 1 | 15 | — | 2 | 6 | 6 | — | remainder |
| | E | 5 | 10 | — | 10 | 1 | — | 8 | 10 | — | remainder |
| | F | 5 | 5 | — | 10 | — | — | 5 | 23.5 | — | remainder |
| | G | 15 | 5 | — | 30 | 2 | 3 | 4 | 2.5 | — | remainder |
| | H | 1 | 2 | — | 14 | — | 13 | — | 17 | 3 | remainder |
| | I | 15 | 15 | — | 15 | — | — | 4 | 1 | — | remainder |

TABLE 3

| | WC-based cemented carbide raw material powder | | TiCN-based cermet raw material powder (for forming TiCN-based cermet layer 1) | | TiCN-based cermet raw material powder (for forming TiCN-based cermet layer 2) | |
|---|---|---|---|---|---|---|
| Type | Type | Thickness (mm) | Type | Thickness (mm) | Type | Thickness (mm) |
| Invention composite compact 1 | B | 0.5 | A | Remainder | — | — |
| 2 | A | 0.25 | B | Remainder | — | — |
| 3 | C | 1.4 | C | Remainder | — | — |
| 4 | A | 1 | A | Remainder | — | — |
| 5 | B | 0.7 | C | Remainder | — | — |
| 6 | C | 1.2 | B | Remainder | — | — |
| 7 | B | 0.5 | A | 1 | D | Remainder |
| 8 | A | 0.25 | B | 1.5 | E | Remainder |
| 9 | C | 1.4 | C | 1.2 | F | Remainder |
| 10 | A | 1 | A | 2 | D | Remainder |
| 11 | B | 0.7 | C | 1 | E | Remainder |
| 12 | C | 1.2 | B | 1.5 | F | Remainder |

(Note)

According to JIS Standards, the CCGT120408 shape has a thickness of 4.76 mm, and thus some of the layer thicknesses are indicated as "remainder".

TABLE 4

| Type | | WC-based cemented carbide raw material powder | | TiCN-based cermet raw material powder | |
|---|---|---|---|---|---|
| | | Type | Thickness (mm) | Type | Thickness (mm) |
| Comparative example composite compact | 1 | A | 0.5 | G | Remainder |
| | 2 | B | 0.25 | H | Remainder |
| | 3 | C | 1.4 | I | Remainder |
| | 4 | D | 1 | A | Remainder |
| | 5 | E | 0.7 | B | Remainder |
| | 6 | F | 1.2 | C | Remainder |
| | 7 | A | — | — | — |
| | 8 | B | — | — | — |
| | 9 | C | — | — | — |

(Note)
According to JIS Standards, the CCGT120408 shape has a thickness of 4.76 mm, and thus some of the layer thicknesses are indicated as "remainder".

TABLE 5

| Type | | Type of composite compact | WC-based cemented carbide | | TiCN-based cermet(note) Component composition | | | | | | (Thickness of WC-based cemented carbide/thickness of composite sintered body) | Thickness of hard coating layer (μm) |
|---|---|---|---|---|---|---|---|---|---|---|---|---|
| | | | Component composition Content of iron group metals (% by mass) | Thickness (mm) | Content of iron group metals (% by mass) | Co/ (Co + Ni) | W (% by mass) | Mo (% by mass) | Nb (% by mass) | Cr (% by mass) | | |
| Invention tool | 1 | 1 | 10 | 0.5 | 19 | 0.7 | 11 | 9 | 4 | 1.0 | 0.1 | — |
| | 2 | 2 | 4 | 0.25 | 4 | 0.5 | 14 | 15 | 10 | 2.0 | 0.05 | — |
| | 3 | 3 | 17 | 1.4 | 20 | 0.8 | 5 | 3 | 3 | 0.3 | 0.3 | — |
| | 4 | 4 | 4 | 1 | 19 | 0.7 | 12 | 10 | 5 | 0.9 | 0.2 | 2 |
| | 5 | 5 | 10 | 0.7 | 20 | 0.8 | 15 | 2 | 2 | 0.2 | 0.15 | 2 |
| | 6 | 6 | 17 | 1.2 | 4 | 0.5 | 6 | 15 | 9 | 1.8 | 0.25 | 1 |

(note)"TiCN-based cermet" corresponds to cermet produced using "TiCN-based cermet raw material powder A to C" in Table 2.

TABLE 6

| Type | | Type of composite compact | WC-based cemented carbide | | TiCN-based cermet | | TiCN-based cermet layer 2(note 2) Component composition | | | | | (Thickness of WC-based cemented carbide/thickness of composite sintered body) | Thickness of hard coating layer (μm) |
|---|---|---|---|---|---|---|---|---|---|---|---|---|---|
| | | | Component composition | Thickness (mm) | TiCN-based cermet layer 1(note 1) Component composition | Thickness (mm) | Content of iron group metals (% by mass) | W (% by mass) | Mo (% by mass) | Nb (% by mass) | Cr (% by mass) | | |
| Invention tool | 7 | 7 | Same as in invention tool 1 | | | 1 | 15 | 15 | 6 | 2 | 0 | 0.1 | — |
| | 8 | 8 | Same as in invention tool 2 | | | 1.5 | 15 | 10 | 9 | 0 | 0 | 0.05 | — |
| | 9 | 9 | Same as in invention tool 3 | | | 1.2 | 10 | 9 | 22 | 0 | 0 | 0.3 | — |
| | 10 | 10 | Same as in invention tool 4 | | | 2 | 14 | 14 | 5 | 1 | 0 | 0.2 | 2 |
| | 11 | 11 | Same as in invention tool 5 | | | 1 | 14 | 9 | 10 | 0 | 0 | 0.15 | 2 |
| | 12 | 12 | Same as in invention tool 6 | | | 1.5 | 10 | 10 | 23 | 0 | 0 | 0.25 | 1 |

(note 1)"TiCN-based cermet layer 1" corresponds to a layer produced using "TiCN-based cermet raw material powder A to C" in Table 2.
(note 2)"TiCN-based cermet layer 2" corresponds to a layer produced using "TiCN-based cermet raw material powder D to F" in Table 2.

TABLE 7

| Type | | Type of composite compact | WC-based cemented carbide | | TiCN-based cermet(note) Component composition | | | | | | (Thickness of WC-based cemented carbide/thickness of composite sintered body) | Thickness of hard coating layer (μm) |
|---|---|---|---|---|---|---|---|---|---|---|---|---|
| | | | Component composition Content of iron group metals (% by mass) | Thickness (mm) | Content of iron group metals (% by mass) | Co/ (Co + Ni) | W (% by mass) | Mo (% by mass) | Nb (% by mass) | Cr (% by mass) | | |
| Comparative example tool | 1 | 1 | 4 | 0.5 | 20 | 0.8 | 30 | 2 | 3 | 0 | 0.1 | — |
| | 2 | 2 | 10 | 0.25 | 3 | 0.3 | 13 | 16 | 13 | 3 | 0.05 | — |

TABLE 7-continued

| Type | | Type of composite compact | WC-based cemented carbide Component composition Content of iron group metals (% by mass) | Thickness (mm) | Content of iron group metals (% by mass) | Co/ (Co + Ni) | TiCN-based cermet[note] Component composition W (% by mass) | Mo (% by mass) | Nb (% by mass) | Cr (% by mass) | (Thickness of WC-based cemented carbide/thickness of composite sintered body) | Thickness of hard coating layer (μm) |
|---|---|---|---|---|---|---|---|---|---|---|---|---|
| | 3 | 3 | 17 | 1.4 | 30 | 0.5 | 14 | 1 | 0 | 0 | 0.3 | — |
| | 4 | 4 | 2 | 1 | 20 | 0.7 | 11 | 9 | 5 | 1 | 0.2 | 2 |
| | 5 | 5 | 20 | 0.7 | 4 | 0.5 | 14 | 14 | 11 | 2 | 0.15 | 2 |
| | 6 | 6 | 20 | 1.2 | 10 | 0.8 | 5 | 3 | 3 | 0.3 | 0.25 | 2 |
| | 7 | 7 | 4 | — | — | — | — | — | — | — | 1 | 2 |
| | 8 | 8 | 10 | — | — | — | — | — | — | — | 1 | 2 |
| | 9 | 9 | 17 | — | — | — | — | — | — | — | 1 | 1 |

[note]"TiCN-based cermet" corresponds to cermet produced using "TiCN-based cermet raw material powder A to C and G to I" in Table 2.

Next, on the invention tools 1 to 12 and the comparative example tools 1 to 9, wet milling tests for alloy steels were carried out under the conditions of
Workpiece: Block materials of JIS•SCM440
Cutting speed: 325 m/min,
Depth of cut: 1.0 mm,
Feed: 0.13 mm/rev., and
Cutting time: 12 minutes, and
the flank wear width or the cutting time taken until the end of the service life was measured.

Furthermore, for the invention tools 1 to 12 and the comparative example tools 1 to 6, the reduced fractions of the W usage (% by mass) in a case in which the cermet was not laminated and all of the respective tools were made of the WC-based cemented carbide were computed from the values of (the thickness of the WC-based cemented carbide)/ (the thickness of the tool) shown in Tables 5 and 6.

These results are shown in Table 8.

TABLE 8

| Type | | Flank wear width (mm) | Reduced fraction of W usage (% by mass) | Type | | Flank wear width (mm) | Reduced fraction of W usage (% by mass) |
|---|---|---|---|---|---|---|---|
| Invention tool | 1 | 0.11 | 78 | Comparative example tool | 1 | *3.7 | 61 |
| | 2 | 0.14 | 79 | | 2 | *3.2 | 80 |
| | 3 | 0.16 | 66 | | 3 | *1.3 | 58 |
| | 4 | 0.09 | 69 | | 4 | *4.3 | 69 |
| | 5 | 0.08 | 80 | | 5 | *4.5 | 69 |
| | 6 | 0.10 | 61 | | 6 | *4.9 | 70 |
| | 7 | 0.13 | 75 | | 7 | 0.12 | 0 |
| | 8 | 0.14 | 83 | | 8 | 0.15 | 0 |
| | 9 | 0.18 | 63 | | 9 | 0.11 | 0 |
| | 10 | 0.10 | 68 | | | | |
| | 11 | 0.09 | 77 | | | | |
| | 12 | 0.12 | 64 | | | | |

The sign "*" for the comparative example tools indicates the cutting time (minutes) taken until the end of the service life due to the generation of abnormal damage such as thermal cracks.

From the results shown in Tables 5 to 8, it is found that, in the invention coating tools, in spite of the reduction of the tungsten usage, when the component composition ranges of the TiCN-based cermet and the WC-based cemented carbide are optimized, and the thickness ratio of the WC-based cemented carbide constituting the rake face including the cutting edge is optimized, the thermal crack resistance does not degrade, in the wet intermittent cutting of alloy steel and the like in which an intermittent and impact high load and a thermal load are exerted on the cutting edge, the propagation and development of cracks are prevented, excellent abnormal damage resistance and wear resistance are exhibited throughout long-term use, and cutting performance as favorable as that of the comparative example tools 7 to 9 produced using the WC-based cemented carbide alone (that is, tools having a reduced fraction of the W usage of 0%) is exhibited.

In contrast, it is evident that, in the comparative example tools 1 to 6, although the tungsten usage is reduced, the thermal crack resistance deteriorates, and the service life ends within a short period of time.

INDUSTRIAL APPLICABILITY

The cutting tool of the present invention in which a composite sintered body is used as the tool body is capable of reducing the tungsten usage, which is a rare metal, and, even in a case in which the cutting tool is used in wet intermittent cutting in which an intermittent and impact high load and a thermal load are exerted on the cutting edge, the thermal crack resistance is excellent, abnormal damages such as chipping, fracture, and peeling does not occur, excellent cutting performance can be exhibited throughout long-term use, and it is possible to sufficiently satisfactorily handle the demand for energy saving and cost reduction in cutting.

The invention claimed is:

1. A cutting tool made of a composite sintered body comprising:
a rake face; and
a flank face, wherein
the cutting tool is made of TiCN-based cermet and WC-based cemented carbide,
the rake face has a planar shape, which is a multangular shape, and an angle formed by the rake face and the flank face is less than 90 degrees,
the rake face includes a cutting edge of the cutting tool and is made of WC-based cemented carbide including 4% to 17% by mass of iron group metals with a remainder being WC as a principal hard phase component,
a thickness of the WC-based cemented carbide is 0.05 to 0.3 times a thickness of the composite sintered body, and
the TiCN-based cermet contains at least a first TiCN-based cermet layer and a second TiCN-based cermet layer, the first TiCN-based cermet layer being adjacent to the WC-based cemented carbide,
in a case in which content proportions of constituent components of the cermet are represented by content proportions of metals, the first TiCN-based cermet layer includes at least 4% to 25% by mass of the iron group metals consisting of Co and Ni, or Co, Ni and Fe, less than 15% by mass of W, 2% to 15% by mass of Mo, 2% to 10% by mass of Nb, and 0.2% to 2% by mass of Cr,
a content proportion of Co relative to a total content of Co and Ni in the first TiCN-based cermet layer is 0.5 to 0.8 (in terms of mass ratio), and
a boundary between the WC-based cemented carbide and the first TiCN-based cermet is formed to be flat.

2. The composite sintered body cutting tool according to claim 1,
wherein a hard coating layer is deposited, at least, on a surface of a portion of the cutting tool made of the WC-based cemented carbide.

3. The composite sintered body cutting tool according to claim 1, wherein the iron group metals of the first TiCN-based cermet consist of Co, Ni and Fe.

4. The composite sintered body cutting tool according to claim 1, wherein the content proportion of Co is 0.5 to 0.7.

5. The composite sintered body cutting tool according to claim 1, wherein the boundary between the WC-based cemented carbide and the first TiCN-based cermet is formed to be flat entirely throughout the boundary.

6. The composite sintered body cutting tool according to claim 1, wherein the composite sintered body is manufactured from a composite compact that is heated from room temperature to 1,280° C. at a rising rate of 5° C./min, then heated in a range from 1,280° C. to 1,380° C. at a high rising rate of 30° C./min or more, and finally heated from 1,380° C. to predetermined 1,420° C. at a rising rate of 5° C./min, afterwards being held at a sintering temperature of 1,420° C. for one hour in a nitrogen atmosphere of 0.1 kPa.

7. The composite sintered body cutting tool according to claim 1, wherein the first TiCN-based cermet layer is formed as a monolayer or multiple layers on a surface of the WC-based cemented carbide using one of a physical vapor deposition method and a chemical vapor deposition method.

8. The composite sintered body cutting tool according to claim 1, wherein the WC-based cemented carbide further includes Ti, Zr, Nb, Ta, and Cr in a total amount thereof 10% by mass or less.

* * * * *